United States Patent [19]

Norton

[11] Patent Number: 4,588,060

[45] Date of Patent: * May 13, 1986

[54] COUPLING FOR DRIVE SHAFT AND SERVO-MOTOR DRIVEN SHAFT WITH UNCOUPLED NEUTRAL POSITION

[76] Inventor: Peter Norton, 170 Beaver Brook, Lincoln Park, N.J. 07035

[*] Notice: The portion of the term of this patent subsequent to Jul. 10, 2001 has been disclaimed.

[21] Appl. No.: 597,077

[22] Filed: Apr. 5, 1984

[51] Int. Cl.⁴ .................. F16D 11/06; B62D 5/04
[52] U.S. Cl. .................. 192/43.2; 192/46; 192/71; 180/79.1
[58] Field of Search .................. 192/43.2, 46, 56 R, 192/71; 180/79.1

[56] References Cited

U.S. PATENT DOCUMENTS

| | | | |
|---|---|---|---|
| 3,463,280 | 8/1969 | Hoffman et al. | 192/46 |
| 3,721,324 | 3/1973 | Schweizer | 192/46 |
| 4,254,852 | 3/1981 | Orozco | 192/46 |
| 4,262,786 | 4/1981 | Taylor | 192/46 |
| 4,458,795 | 7/1984 | Norton | 192/43.2 |

Primary Examiner—Craig R. Feinberg
Assistant Examiner—David A. Okonsky
Attorney, Agent, or Firm—Reising, Ethington, Barnard, Perry & Milton

[57] ABSTRACT

A mechanical coupling is disclosed for a power steering system with a servo-motor drive through a drive transmitting member to the driven member and the fail-safe manual drive through a lost motion coupling between the control member and the driven member. First and second normally disengaged one-way clutches are provided for coupling the drive transmitting member with the driven member in first and second directions, respectively. First and second engaging means are provided for engaging the first and second one-way clutches, respectively, in response to movement of the control member in said first and second directions, respectively.

15 Claims, 7 Drawing Figures

COUPLING FOR DRIVE SHAFT AND SERVO-MOTOR DRIVEN SHAFT WITH UNCOUPLED NEUTRAL POSITION

FIELD OF THE INVENTION

This invention relates to a coupling for interconnecting a control shaft, a driven shaft and a servo-motor which normally powers the driven shaft. This coupling is particularly useful in an automotive vehicle power steering system. It is an improvement on my invention set forth in my prior patent applications U.S. Ser. No. 392,990 entitled "COUPLING FOR DRIVE SHAFT AND SERVO-MOTOR DRIVEN SHAFT" and U.S. Ser. No. 533,443 entitled "COUPLING WITH PIVOTED PAWLS FOR DRIVE SHAFT AND SERVO-MOTOR DRIVEN SHAFT".

BACKGROUND OF THE INVENTION

In general, a power steering system for an automotive type vehicle includes a control shaft or steering column which is controlled by the vehicle operator turning the steering wheel, and a power assist device for the driven steering system. Hydraulic devices are conventionally used to provide the power assist. In addition, it is known to use a servo-motor arrangement to provide the power assist for the drive. An example of the use of a servomotor arrangement is disclosed in U.S. Pat. No. 3,893,534 issued July 8, 1975 to Steinmann.

In any power assist device used in a power steering system, there is a danger of malfunctioning or power failure. Although failures are rare, it is necessary to provide a direct drive alternative to the power assist drive during times of malfunctioning or failure. When the servo-motor resists or opposes the action of the driver, the servo-motor should be disengaged, whereas it should remain engaged if it provides some assistance even though it may be in a state of partial failure. Before my invention set forth in U.S. Ser. No. 392,990, systems lacked these qualities to some degree or had other deficiencies which kept them from achieving commercial success.

In addition to the need for the fail-safe feature mentioned above it is desirable to minimize the resistance or drag imposed by the drive train of the servo-motor on the movement of the dirigible wheels to the straight-ahead position when the steering wheel is allowed to return to the straightahead position.

A general object of this invention is to provide a coupling for power steering which provides the aforementioned features and overcomes certain disadvantages of the prior art.

SUMMARY OF THE INVENTION

In accordance with this invention, an improved clutch means is provided for use in a drive transmitting coupling for coupling a control member and a drive transmitting member with a driven member. The clutch means is normally disengaged, i.e. it is disengaged when the control member is in a neutral or central position with respect to the driven member. However, it is engaged for coupling the drive transmitting member with the driven member for transmitting driving effort in either direction in accordance with the turning direction of the control member from neutral while being disengaged for transmitting driving effort in the direction opposite the turning direction of the control member. A lost motion means operatively engages the control member with the driven member for direct drive in the event of failure of the drive transmitting member to provide desired driving motion. This is accomplished by first and second one-way clutches having, respectively, first and second sets of pawls which are pivotally mounted on the driven member and engageable, for drive transmission, with the drive transmitting member but held normally disengaged. First and second sets of actuating members are mounted on the driven member for engaging the first and second sets of pawls, respectively, with the drive transmitting member in response to relative movement of the control member with respect to the driven member.

Further, in accordance with this invention, the control member is operatively engageable, after lost motion travel, with the driven member for direct drive.

A more complete understanding of this invention may be obtained from the detailed description that follows taken with the accompanying drawings.

BEST MODE FOR CARRYING OUT THE INVENTION

Figure 1:
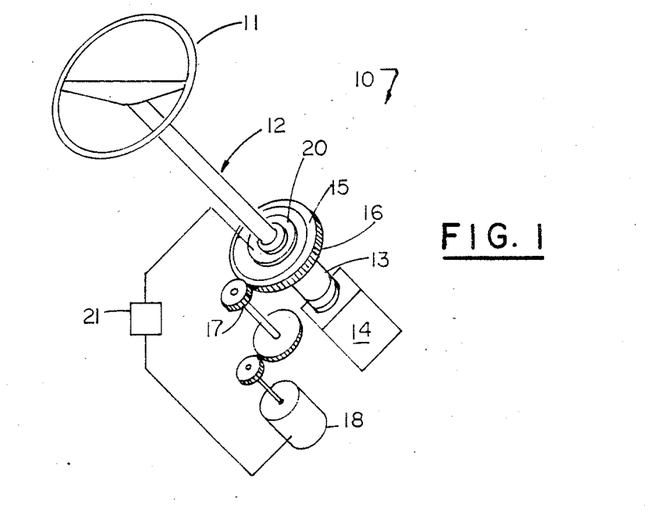
FIG. 1 is a schematic, generally perspective, view of an automotive steering system showing the general application of the coupling.

FIG. 1 schematically illustrates a servo assisted steering system 10 which, in general, comprises a manually operable steering wheel 11 mounted upon a control shaft 12. The control shaft operates an angular displacement sensor 20 which controls an amplifier 21 to power a servo-motor 18 which drives driven shaft 13, which connects to and actuates a conventional steering gear mechanism 14. Such steering gear mechanisms generally comprise appropriate gears, linkages, etc., for turning the dirigible front wheels in response to the manual turning of the steering wheel.

Mounted upon the driven shaft 13 is a coupling block 15. A ring gear 16 is rotatable mounted upon the peripheral surface of the coupling block. This ring gear is driven by a gear train 17 connected to a reversible servo-motor 18.

When the steering wheel 11 rotates the control shaft 12, a sensing device 20, which is schematically shown, senses the relative angular movement of the control shaft with respect to the driven shaft. The sensing device signals and controls, through an appropriate amplifier control system 21, the synchronous operation of the servo-motor. The particular type of sensor selected is within the skill of the art and forms no part of the invention. Likewise, the amplifier control system, drive train and servo-motor are also conventional. Thus, these components are illustrated only schematically.

Figures 3, 6:
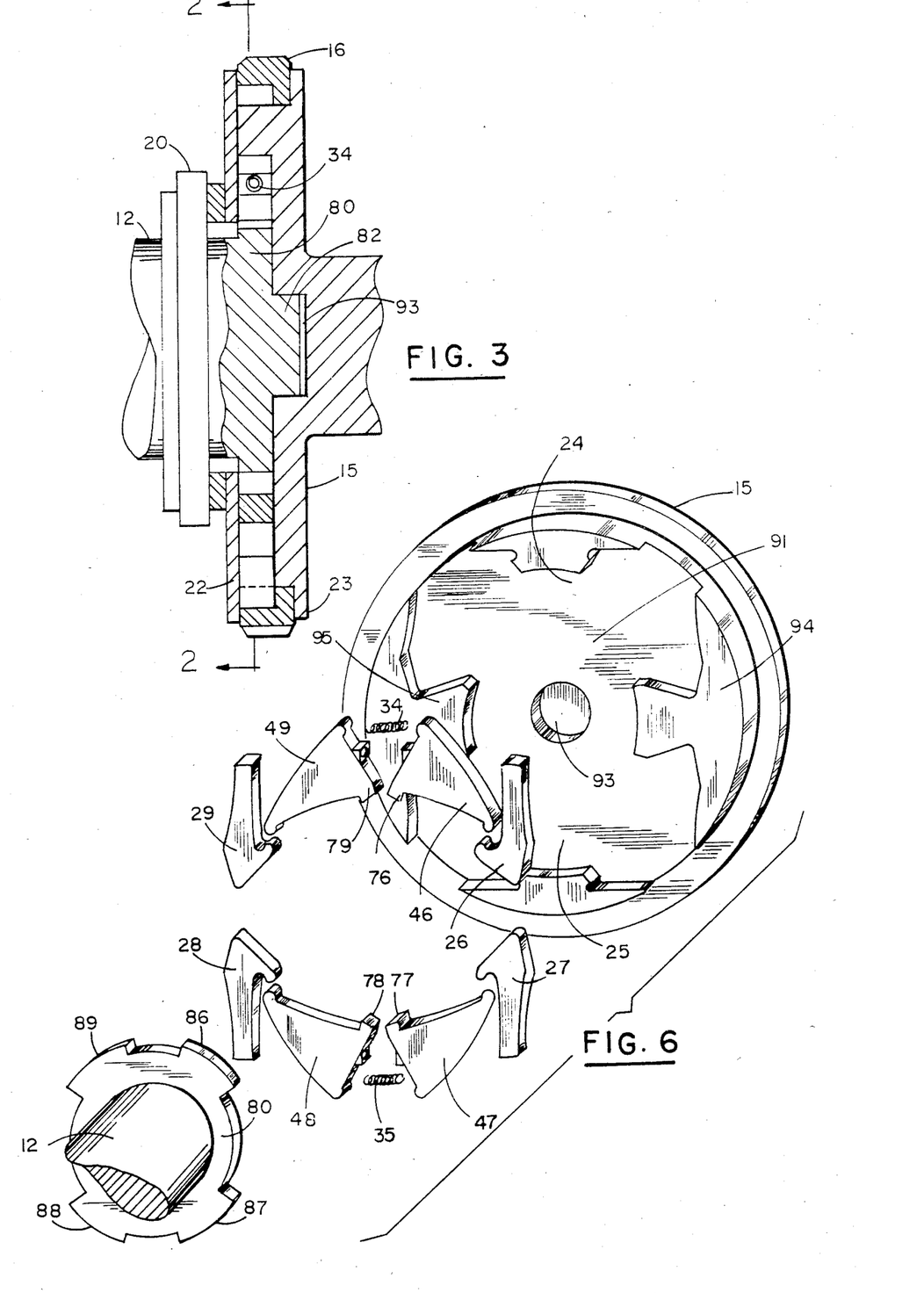
FIG. 3 is a cross-sectional view taken in the direction of arrows 3—3 of FIG. 2.
FIG. 6 is a disassembled view of the coupling block, pawls, actuating members and the actuator end of the control shaft, showing the relationship between these parts.

As shown in FIG. 3, the ring gear 16 is maintained in position upon the coupling block by suitable lips or flanges, such as flange 23 formed on one edge of the coupling block. Other suitable guides (such as the cover plate 22 shown) may be provided to properly position the gear.

Figure 2:
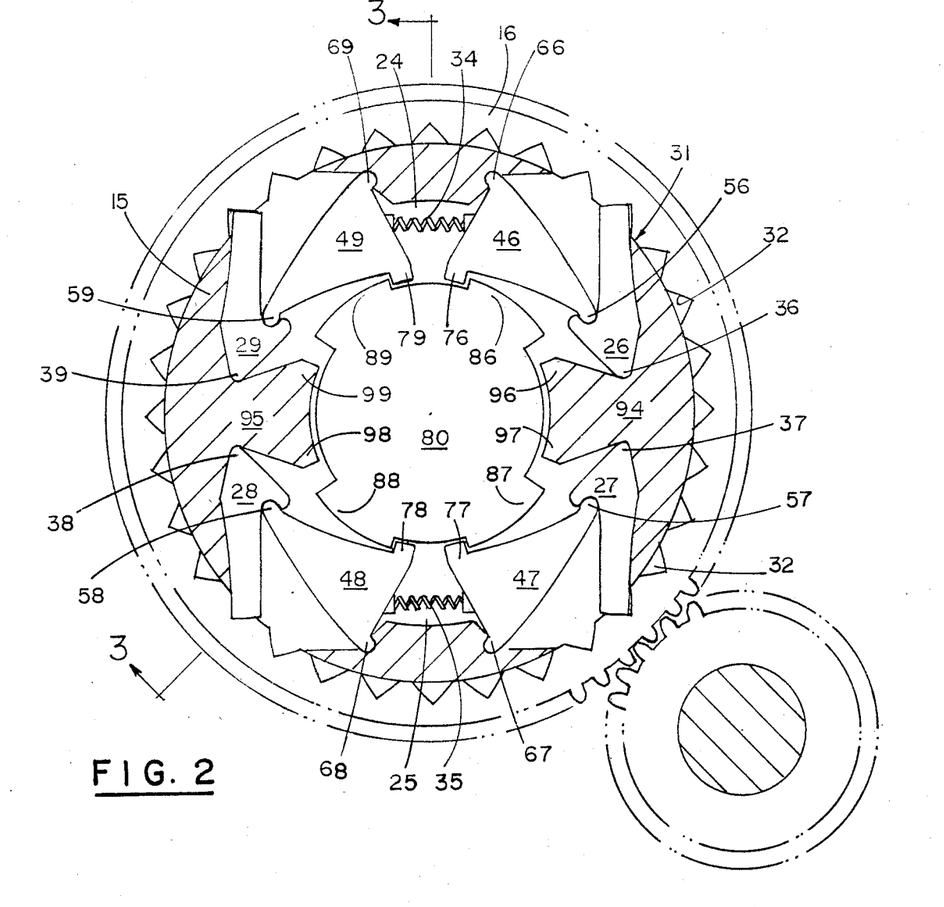
FIG. 2 is an end view of the control shaft and coupling block, taken in the direction of arrows 2—2 of FIG. 3.

Referring to FIG. 2, the coupling block is an annular member and includes two opposing compartments 24 and 25 which are separated by internal, diametrically opposed abutments or stop flanges 94 and 95. Elongated pawls 26, 27, 28 and 29 are rotatably fitted within the compartment to pivot about axes 36, 37, 38 and 39, respectively. There are two pairs of opposed pawls 26 and 27, and 28 and 29.

The outer end of each pawl is formed with plural triangular teeth 30 which are adapted to mesh with triangular teeth 31 which are formed on the inside surface of the ring gear 16. Each tooth 30 and 31 is symmetrical about a radius line of the ring gear. The pawls operate as unidirectional connectors. That is, the pawls 26 and 28 positively lock the coupling block 15 and gear together for rotation in one direction but release, in a ratchet-like action, in the event of opposite relative rotation of the gear upon the coupling block. Conversely, the pawls 27 and 29 unidirectionally positively lock the gear to the coupling block for rotation in a direction opposite to that mentioned above. Equally, these pawls release in a ratchet-like manner, where the rotational direction is reversed. Consequently, it can be seen that by retracting pawls 26 and 28, or alternatively, pawls 27 and 29, the gear 16 will be locked to the coupling block for drive in one direction, but will slip or rotate should the drive direction be reversed. Intermediate actuators 46, 47, 48 and 49 engage pawls 26, 27, 28 and 29 at pivots 56, 57, 58 and 59 while pivoting about axes 66, 67, 68 and 69.

Springs 34 and 35 urge the intermediate actuators outwardly thereby urging the pawls toward engagement of the teeth 30 thereon with the teeth 31 on the ring gear 16. Conventional coil springs may be used or alternatively, leaf springs can be used. As shown in FIGS. 2 and 3, a central actuator 80 is mounted on the control shaft 12. The actuator 80 is formed with teeth 86, 87, 88 and 89 for purposes which will be described presently. The intermediate actuators 46, 47, 48 and 49 are provided with tabs 76, 77, 78 and 79, respectively, which are adapted to abut the sides of teeth 86, 87, 88 and 89, respectively. As shown in FIG. 2, with the central actuator 80 in a neutral or central position relative to the coupling block 15, the pawls are held in a neutral or normal position by the intermediate actuators which are spring biased to a position at which the tabs 76, 77, 78 and 79 abut the teeth 86, 87, 88 and 89, respectively. In this normal position, the teeth 30 on pawls 26, 27, 28 or 29 are spaced from the teeth 31 on the ring gear 16. Thus, there is no driving engagement between the ring gear 16 and the coupling block 15.

The pawls and intermediate actuators are preferably sized so that at the point in their motion where the pivots 56, 57, 58 or 59 lie on straight lines connecting respectively axes 36, 37, 38 or 39 to axes 66, 67, 68 or 60 there is a close fit with little free play. By design this position can be made to be the half way point between the extremes of motion of the pawls and intermediate actuators and by so doing and by virtue of the small angles through which the actuators and pawls rotate the free play can be made small at all positions of the pawls and intermediate actuators.

Referring to FIGS. 3 and 6, the control shaft 12 has an end located within the coupling block. The central actuator 80 is formed on or attached to this end and extends transversely to the axis of the shaft. This central actuator fits into a central recessed portion 91 located between the coupling block internal stop flanges 94 and 95. As shown in FIGS. 3 and 6, the central actuator 80 has a stub shaft 82 which rotatably fits within a socket 93 formed within the coupling block and establishes the radial position of the actuator 80.

Figures 4, 5:
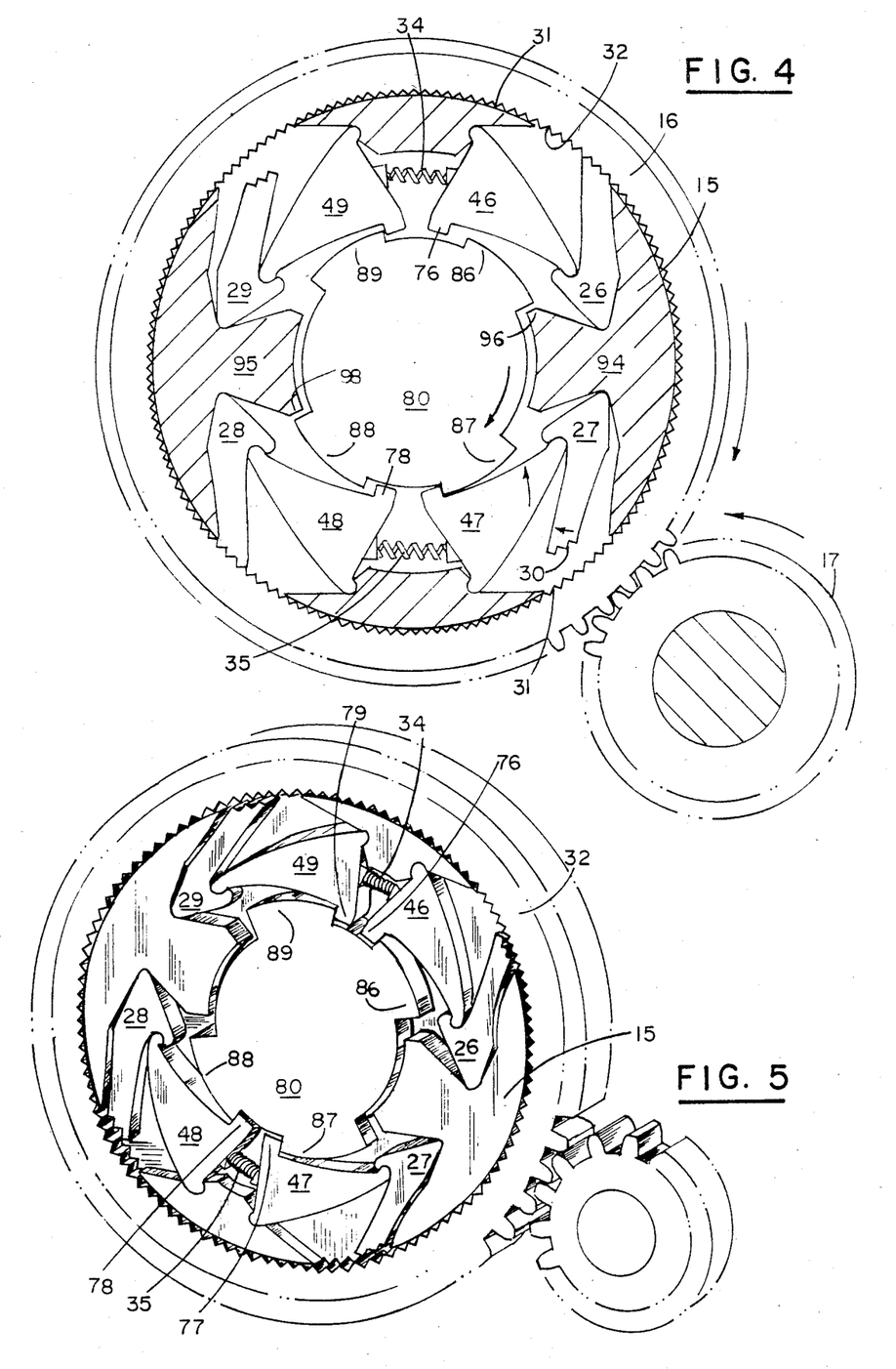
FIG. 4 is a view similar to FIG. 2, but illustrating the position of the parts with the control shaft being sufficiently rotated relative to the driven member that the ring gear is unidirectionally engaged for transmission of torque to the clutch body.
FIG. 5 is a perspective view of the clutch assembly.
Figure 6:
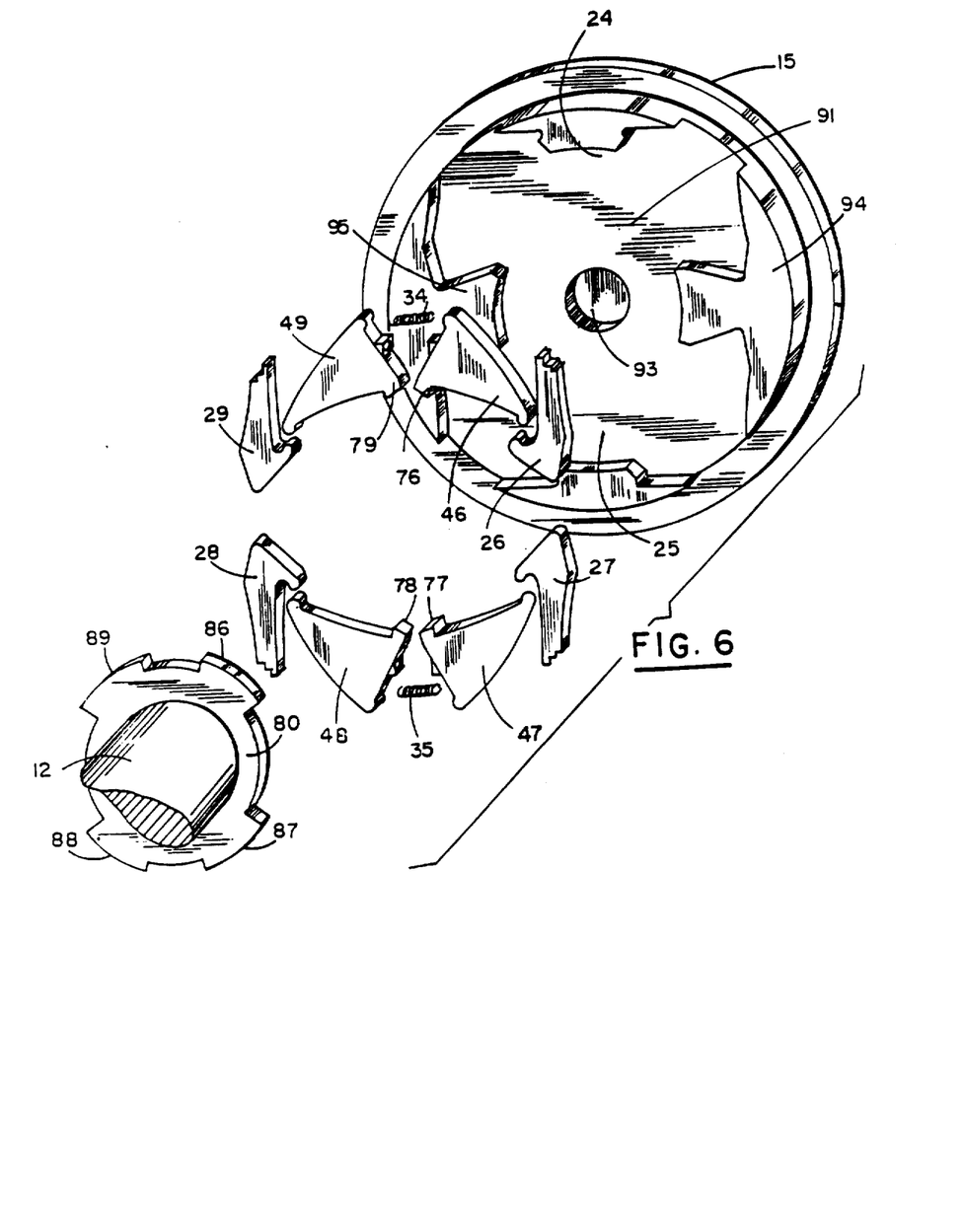

In normal operation, with the steering wheel 11 in the neutral or straight-ahead position, the coupling parts are positioned as illustrated in FIGS. 2 and 5. The tabs 76, 77, 78 and 79 are seated against the teeth 86, 87, 88 and 89, respectively, under the bias force of the springs 34 and 35. The intermediate actuators 46, 47, 48 and 49 hold the pawls 26, 27, 28 and 29 in a position in which the teeth 30 are out of engagement with teeth 31. Consequently, the ring gear 16 is disengaged from the coupling block 15.

During normal operation, when the driver turns the steering wheel 11 either clockwise or counterclockwise, the sensor 20 senses the turning movement and transmits a signal to the amplifier and control system 21 in turn controls the servo-motor 18. At the same time, a small displacement of the central actuator 80 relative to the coupling block 15 occurs and causes a one-way driving engagement between the ring gear 16 and coupling block 15 in the appropriate direction in the following manner. As shown in FIG. 4, rotation of the steering wheel 11 in a clockwise direction (as indicated by the arrow on actuator 80) causes the teeth 87 and 89 on actuator 80 to pivot the intermediate actuators 47 and 49 in a counterclockwise direction and thereby pivot the pawls 27 and 29 in a clockwise direction and retract the teeth 30 thereon farther from the teeth 31 on the ring gear 16. Simultaneously, the teeth 86 and 88 move away from the tabs 76 and 78 on the intermediate actuators 46 and 48, respectively. This permits the springs 34 and 35 to pivot the intermediate actuators 46 and 48 in a counterclockwise direction which causes the pawls 26 and 28 to pivot in clockwise direction so that the teeth 30 thereon are forced into meshing engagement with the teeth 31 on the ring gear 16. Thus, there is a driving engagement between the ring gear and the coupling block 15 for rotation in the clockwise direction only. It will now be appreciated that rotation of the steering wheel in the counterclockwise direction will cause the pawls 27 and 29 to move and establish a driving engagement between the ring gear 16 and the coupling block 15 for rotation of the coupling block in the counterclockwise direction only. Thus, the motor operates in response to the turning of the steering wheel and control shaft 12 and transmits power through the gear train 17 to the ring gear 16. The ring gear 16, due to the power assist from the motor, rotates synchronously with the control shaft to rotate the coupling block 15. When the driven shaft 13 is rotated, it operates the conventional steering gear box 14 for steering the vehicle in the conventional manner.

Figure 7:
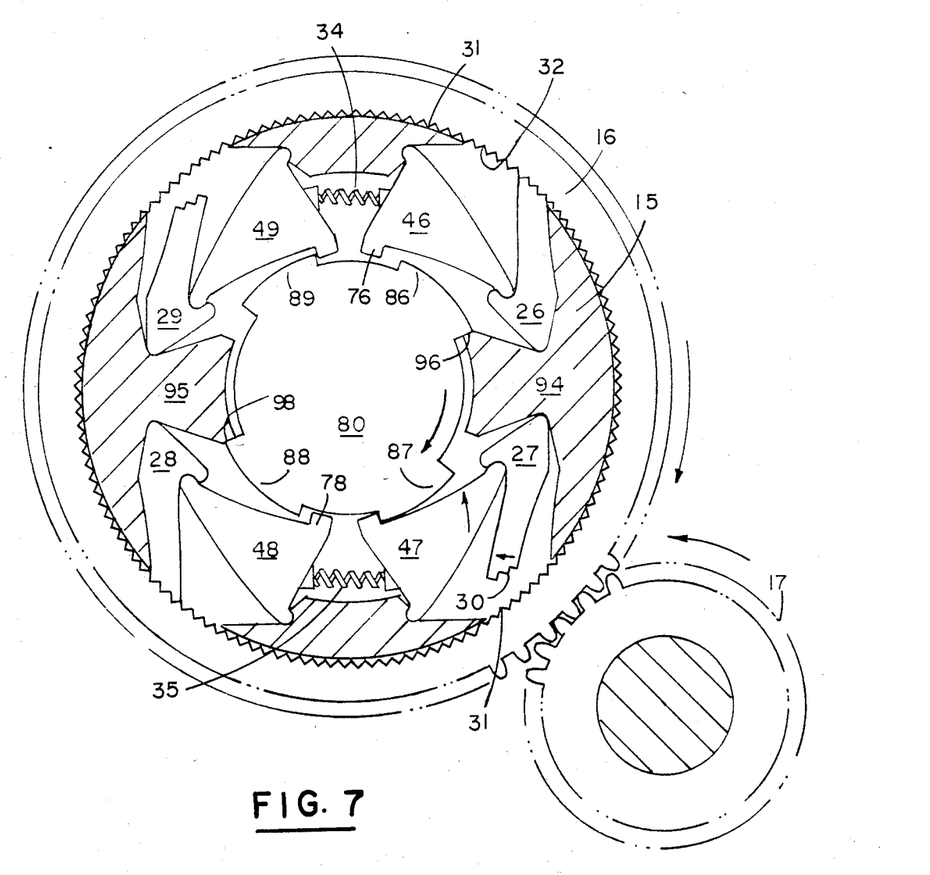
FIG. 7 is a figure similar to FIG. 4 but illustrating the position of the parts with the control shaft sufficiently rotated relative to the driven shaft that the control shaft is directly engaged to the driven shaft for direct drive.

In the abnormal or fail-safe operation, such as in the event of a power failure or malfunction of the servo motor, sensor, amplifier or gear train, etc., the coupling operates to directly couple the control shaft to the driven shaft and to disengage any power assist applied in a direction counter to the desired direction. Referring to FIG. 7, assuming a partial power failure, rotation of the steering wheel 11 in a clockwise direction causes the pawls 26 and 28 to couple the gear 16 to the coupling block 15 for power assistance in a clockwise direction. However, counterclockwise rotation of the gear 16 relative to the coupling block 15 is permitted, first, because the pawls 27 and 29 are retracted and second, because the teeth 30 on the pawls 26 and 28 will ratchet over the teeth 31 on the gear 16 without driving engagement when the gear rotates counterclockwise.

As a result of the partial power failure the manual turning effort on the steering wheel 11 will cause the teeth 86 and 88 to abut the surfaces 96 and 98 of the stop flanges 94 and 95 as illustrated in FIG. 7. This provides a solid direct drive connection between the control shaft 12, through the central actuator 80, to the coupling block 15 for positive drive of the coupling block by the control shaft 12. Thus, there is a lost motion connection betwen the central actuator 80 and the coupling block 15. To the extent that the power assist system is still able to produce torque, even though at a level insufficient to maintain synchronism, that torque, if applied in the direction of desired rotation (see arrows in FIG. 7), will assist the turning of the coupling block and driven shaft. conversely, if there is torque applied in the opposing direction, such as due to malfunctioning of the servo-motor, then that torque causes idling rotation of the gear 16 upon the coupling block 15 and the power is not transmitted to the coupling block. Thus, wrongly directed torque does not oppose or interfere with the direct rotational effort of the direct drive of drive shaft 12 to the coupling block.

Rotation of the steering wheel 11 in the opposite, counterclockwise direction, produces a reverse effect to that shown in FIG. 7 and described above. Thus, there is a fail-safe coupling which operates independently of any power failure or malfunctioning of the power assist system but which can take advantage of any remaining power assistance so long as it is applied in the desired direction of rotation.

In addition to the normal operation or the fail-safe operation, as described above, the coupling functions to de-couple the ring gear 16 and the coupling block 15 from any driving engagement whatsoever when there is no torque applied to the control shaft which occurs when the steering wheel is released and allowed to return to the straight-ahead position. Thus, there is no drag or resistance imposed by the drive train of the servo-motor on the movement of the dirigible wheels of the vehicle to the straight-ahead position.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A drive transmitting coupling for coupling a control member and a drive transmitting member with a driven member, said coupling comprising:
   a first one-way clutch for coupling said drive transmitting member with said driven member for transmitting driving effort in one direction, a second one-way clutch for coupling said drive transmitting member with said driven member for transmitting driving effort in an opposite direction, both of said clutches being disengaged when said control member is in a central position relative to said driven member,
   a first engaging means for engaging said first one-way clutch in response to movement of said control member in said one direction from said central position relative to said driven member,
   and a second engaging means for engaging the second one-way clutch in response to movement of said control member in said opposite direction from said central position relative to said driven member,
   whereby said driven member can be driven by said drive transmitting member only in the direction of movement of the control member from its central position relative to said driven member.

2. The invention as defined in claim 1 in which said control member, driven member and drive transmitting member are adapted to transmit torque and wherein,
   said first and second one-way clutches couple said drive transmitting member and said driven member for transmitting torque.

3. The invention as defined in claim 2 including:
   a lost motion means adapted to couple said control member with said driven member.

4. The invention as defined in claim 3 wherein,
   said driven member comprises an annular body having a set of radially inwardly extending abutment members,
   said control member includes an actuator head extending between said abutment members, said actuator head having a set of radially outwardly extending teeth adapted to engage said abutment members for providing a lost motion connection therebetween.

5. The invention as defined in claim 2 including:
   said first one-way clutch comprises a first set of pawls pivotally mounted on said driven member for engagement with said drive transmitting member,
   and said second one-way clutch comprises a second set of pawls pivotally mounted on said driven member for engagement with said drive transmitting member,
   said first and second sets of pawls being operatively coupled with said first and second engaging means, respectively.

6. The invention as defined in claim 5 wherein,
   each of said first and second sets of pawls includes more than one pawl.

7. The invention as defined in claim 5 wherein,
   said drive transmitting member comprises a ring having a set of internal ratchet teeth adapted to be engaged by said first and second sets of pawls.

8. The invention as defined in claim 7 wherein each of said ratchet teeth is symmetrical about a radius line of said ring.

9. The invention as defined in claim 5 wherein,
   each pivot comprises a pocket in one of the articulated elements with a surface approximating a segment of a cylinder and a surface on the other of the articulating elements mating with the surface of the pocket.

10. The invention as defined in claim 9 wherein, the three pivots of each pawl and lever pair are positioned approximately on a straight line whereby free play is minimized.

11. The invention as defined in claim 5 wherein, said first engaging means comprises a set of actuating members operativley engageable with said control member for engaging said first set of pawls with said drive transmitting member in response to movement of said control member in said one direction relative to said driven member, said second engaging means comprises a second set of actuating members operatively engageable with said control member for engaging said second set of pawls with said drive transmitting member in response to movement of said control member in said opposite direction relative to said driven member.

12. The invention as defined in claim 11 wherein each of said actuating members is a lever in pivotal engagement with its respective pawl and with said driven member.

13. The invention as defined in claim 12 wherein, the pawls and levers of said first set are alternately disposed with the pawls and levers of the second set in a circumferential direction around said driven member.

and spring means are provided between adjacent levers for urging the respective pawls to rotate in opposite directions.

14. The invention as defined in claim 12 wherein each of said levers includes an arm extending the path of said teeth on said actuator head whereby the first set of levers is actuated to engage the first set of pawls on rotation of the control member relative to the driven member in one direction and the second set of levers is actuated to engage the second set of pawls on rotation of the control member relative to the driven member in the opposite direction.

15. The invention as defined in claim 12 wherein, each pivot comprises a pocket in one of the articulated elements with a surface approximating a segment of a cylinder and a surface on the other of the articulating elements mating with the surface of the pocket.

* * * * *

UNITED STATES PATENT AND TRADEMARK OFFICE
CERTIFICATE OF CORRECTION

PATENT NO. : 4,588,060

DATED : May 13, 1986

INVENTOR(S) : Peter Norton

It is certified that error appears in the above-identified patent and that said Letters Patent is hereby corrected as shown below:

The title page should be deleted to appear as per attached title page.

Figures 2 and 6 should be deleted to appear as shown on the attached sheets.

Column 2, line 61, "rotatable" should read -- rotatably --.

Column 5, line 31, "conversely" should read -- Conversely --.

Column 8, Claim 13, line 4, delete the period (.) and insert a comma (,).

Signed and Sealed this

Fourth Day of July, 1989

Attest:

DONALD J. QUIGG

*Attesting Officer*  *Commissioner of Patents and Trademarks*

United States Patent [19]

Norton

[11] Patent Number: 4,588,060
[45] Date of Patent: * May 13, 1986

[54] COUPLING FOR DRIVE SHAFT AND SERVO-MOTOR DRIVEN SHAFT WITH UNCOUPLED NEUTRAL POSITION

[76] Inventor: Peter Norton, 170 Beaver Brook, Lincoln Park, N.J. 07035

[*] Notice: The portion of the term of this patent subsequent to Jul. 10, 2001 has been disclaimed.

[21] Appl. No.: 597,077

[22] Filed: Apr. 5, 1984

[51] Int. Cl.[4] .......................... F16D 11/06; B62D 5/04
[52] U.S. Cl. ..................................... 192/43.2; 192/46; 192/71; 180/79.1
[58] Field of Search ............... 192/43.2, 46, 56 R, 192/71; 180/79.1

[56] References Cited

U.S. PATENT DOCUMENTS

| | | | |
|---|---|---|---|
| 3,463,280 | 8/1969 | Hoffman et al. | 192/46 |
| 3,721,324 | 3/1973 | Schweizer | 192/46 |
| 4,254,852 | 3/1981 | Orozco | 192/46 |
| 4,262,786 | 4/1981 | Taylor | 192/46 |
| 4,458,795 | 7/1984 | Norton | 192/43.2 |

Primary Examiner—Craig R. Feinberg
Assistant Examiner—David A. Okonsky
Attorney, Agent, or Firm—Reising, Ethington, Barnard, Perry & Milton

[57] ABSTRACT

A mechanical coupling is disclosed for a power steering system with a servo-motor drive through a drive transmitting member to the driven member and the fail-safe manual drive through a lost motion coupling between the control member and the driven member. First and second normally disengaged one-way clutches are provided for coupling the drive transmitting member with the driven member in first and second directions, respectively. First and second engaging means are provided for engaging the first and second one-way clutches, respectively, in response to movement of the control member in said first and second directions, respectively.

15 Claims, 7 Drawing Figures

FIG. 2

Patent No. 4,588,060

FIG. 6